United States Patent
Parrella, Sr. et al.

(10) Patent No.: US 9,574,551 B2
(45) Date of Patent: Feb. 21, 2017

(54) POWER TOWER—SYSTEM AND METHOD OF USING AIR FLOW GENERATED BY GEOTHERMAL GENERATED HEAT TO DRIVE TURBINES GENERATORS FOR THE GENERATION OF ELECTRICITY

(71) Applicant: GTherm Inc., Westport, CT (US)

(72) Inventors: Michael J. Parrella, Sr., Weston, CT (US); Jonathan Parrella, Weston, CT (US); Michael J. Parrella, Jr., Southbury, CT (US); Martin A. Shimko, Quechee, VT (US)

(73) Assignee: GTherm, Inc., Westport, CT (US)

( * ) Notice: Subject to any disclaimer, the term of this patent is extended or adjusted under 35 U.S.C. 154(b) by 188 days.

(21) Appl. No.: 14/396,562

(22) PCT Filed: Dec. 17, 2012

(86) PCT No.: PCT/US2012/070104
§ 371 (c)(1),
(2) Date: Oct. 23, 2014

(87) PCT Pub. No.: WO2014/035453
PCT Pub. Date: Mar. 6, 2014

(65) Prior Publication Data
US 2015/0107243 A1   Apr. 23, 2015

Related U.S. Application Data

(60) Provisional application No. 61/576,700, filed on Dec. 16, 2011.

(51) Int. Cl.
*F03G 4/00* (2006.01)
*F24J 3/08* (2006.01)
(Continued)

(52) U.S. Cl.
CPC ............. *F03G 6/045* (2013.01); *F03D 1/04* (2013.01); *F03D 9/00* (2013.01); *F03D 13/20* (2016.05);
(Continued)

(58) Field of Classification Search
CPC .............. F03D 1/04; F03D 9/00; F03D 11/04; F03G 6/045; F24J 3/08; F24J 2003/087; Y02B 10/30; F05B 2240/131; Y02E 10/10; Y02E 10/728; Y02E 10/465
See application file for complete search history.

(56) References Cited

U.S. PATENT DOCUMENTS

| 3,936,652 A | 2/1976 | Levine |
| 8,534,069 B2 | 9/2013 | Parrella |

(Continued)

OTHER PUBLICATIONS

Colmac Heat Pipe Coils, archived as early as Feb. 14, 2010.*
(Continued)

*Primary Examiner* — Audrey K Bradley
(74) *Attorney, Agent, or Firm* — Ware, Fressola, Magure & Barber, LLP

(57) ABSTRACT

Apparatus is provided having one or more SWEGS that may be configured to heat air in a draft power tower arrangement. In a closed loop, cold fluid may be pumped into the SWEGS and heated to a temperature in a range of e.g., 100° C.-300° C., and hot fluid pumped out of the SWEGS. This fluid flows through a heating element (e.g., a radiator or specially designed heat exchanger) that heats the air in the draft power tower arrangement.

16 Claims, 8 Drawing Sheets

(51) Int. Cl.
*F03G 6/04* (2006.01)
*F03D 1/04* (2006.01)
*F03D 9/00* (2016.01)

(52) U.S. Cl.
CPC ............ *F24J 3/08* (2013.01); *F05B 2240/131* (2013.01); *F24J 2003/087* (2013.01); *Y02B 10/30* (2013.01); *Y02E 10/10* (2013.01); *Y02E 10/465* (2013.01); *Y02E 10/728* (2013.01)

(56) References Cited

U.S. PATENT DOCUMENTS

| | | |
|---|---|---|
| 2003/0071373 A1 | 4/2003 | Hubbard et al. |
| 2004/0211184 A1 | 10/2004 | Bharathan et al. |
| 2005/0150225 A1 | 7/2005 | Gwiazda et al. |
| 2009/0120090 A1 | 5/2009 | Dubois |
| 2009/0320475 A1 | 12/2009 | Parrella |
| 2010/0270001 A1 | 10/2010 | Parrella |
| 2010/0270002 A1 | 10/2010 | Parrella |
| 2010/0275598 A1* | 11/2010 | Raffaele ............... F02C 1/05 60/641.8 |
| 2010/0276115 A1 | 11/2010 | Parrella |
| 2015/0159918 A1 | 6/2015 | Parrella et al. |
| 2015/0163965 A1 | 6/2015 | Parrella et al. |

OTHER PUBLICATIONS

"Solar Updraft Towers", http://climatelab.org/Solar_Updraft_Towers#ref_2, accessed Dec. 12, 2012 (6 pages).

* cited by examiner

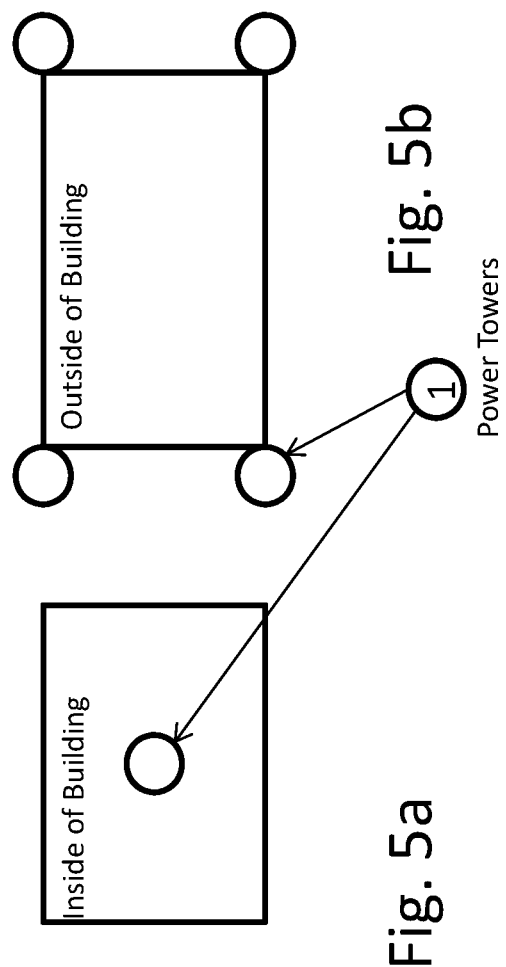

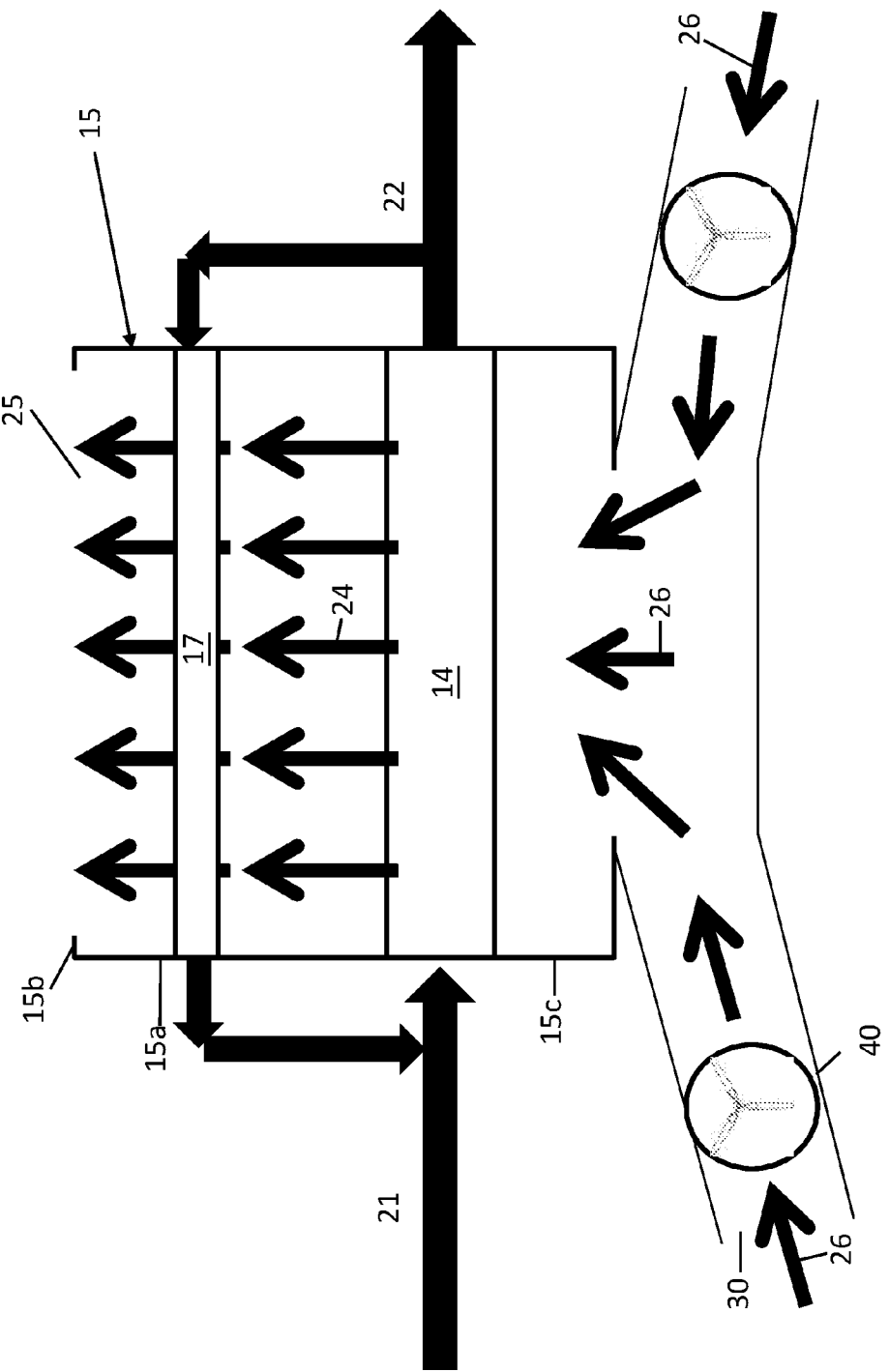

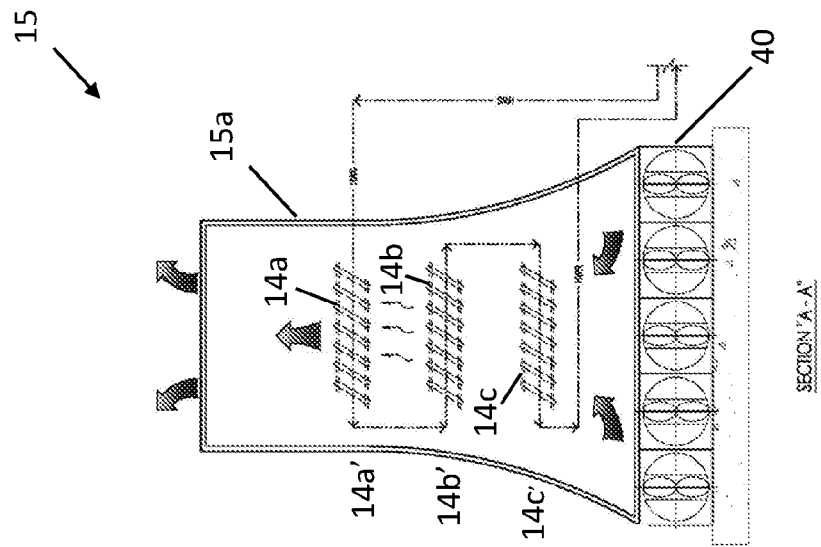
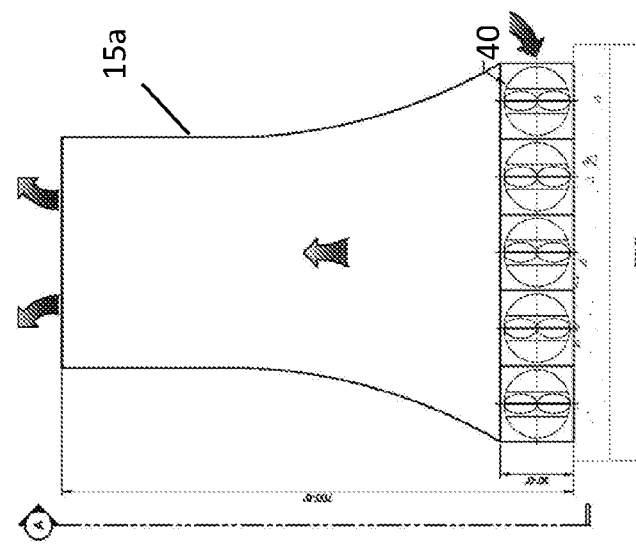
Figure 7a

POWER TOWER—SYSTEM AND METHOD OF USING AIR FLOW GENERATED BY GEOTHERMAL GENERATED HEAT TO DRIVE TURBINES GENERATORS FOR THE GENERATION OF ELECTRICITY

CROSS-REFERENCE TO RELATED APPLICATIONS

This application corresponds to international patent application serial number PCT/US2012/070104, filed 17 Dec. 2012, which claims benefit to provisional patent application Ser. No. 61/576,719, filed 16 Dec. 2011, which is incorporated by reference in their entirety.

BACKGROUND OF THE INVENTION

1. Field of Invention

The present invention relates to the field geothermal energy; and more particularly relates to using a single-well engineered geothermal system (SWEGS) for use in power generation.

2. Description of Related Art

FIG. 1: Solar Updraft Tower

FIG. 1 shows a current form of a solar tower that is known in the art. The solar thermal power station is composed of three major components: the solar collector, solar tower and turbines. The large solar collector canopy can be constructed from a transparent material with heat enhancing properties.

The idea of a Solar Updraft Tower has been around since 1976, when two German engineers, Jörg Schlaich and Rudolf Bergermann, created the design. In 1979, they developed the first prototype with a designed peak output of 50 kW in Manzanares, about 100 miles south of Madrid, Spain. (See http://climatelab.org/SolarUpdraftTowers#ref 2.) An initial analysis of this pilot plant by Haaf et. al. indicated that economical power generation appeared possible with a plant designed for up to 400 MW/pk. However, in more recent studies, it has been concluded that solar towers that produce greater than 100 MW are capable of generating electricity at rates comparable to other types of conventional power plants.

The solar updraft tower is a renewable-energy power plant. It combines the chimney effect, the greenhouse effect and wind turbines. Air is heated by sunshine and contained in a very large greenhouse-like structure around the base of a tall chimney, and the resulting convection causes air to rise up the updraft tower. This airflow drives turbines, which produce electricity.

The generating ability of a solar updraft power plant depends primarily on two factors: the collector area and the chimney height. With a larger collector area, a greater volume of air is warmed to flow up the chimney; collector areas as large as 7 kilometers (4.3 mi) in diameter have been considered. With a larger chimney height, the pressure difference increases the stack effect; chimneys as tall as 1,000 meters (3,281 ft) have been considered.

Turbines can be installed in a ring around the base of the tower, with a horizontal axis, as formerly planned for an Australian project and seen in FIG. 1; or as in a prototype in Spain, a single vertical axis turbine can be installed inside the chimney.

Carbon dioxide is emitted only negligibly while operating, but is emitted more significantly during manufacture of its construction materials, particularly cement. Net energy payback is estimated to be about 2-3 years.

A solar updraft tower power station would consume a significant area of land if it were designed to generate as much electricity as is produced by modern power stations using conventional technology. Construction would be more likely in hot areas with large amounts of very low-value land, such as deserts, or otherwise degraded land.

There are several disadvantages to the solar updraft tower design. Perhaps the most important (aside from the cost of electricity generation), is the intensive amount of land needed to build the collector to an appropriate scale. Not only are large, flat pieces of land required, but this land cannot be in an area prone to natural disasters or frequent bad weather. Either of these occurrences would render the tower useless due to inefficiency or malfunction. Additionally, solar updraft towers are only 10-20% as efficient as solar cells in creating energy from solar radiation. It is the simplicity and relative inexpensiveness of the materials required that appear to make the system economical.

Aside from the disadvantages of the solar updraft tower power plant, there are a few disadvantages when used in a building as well. Several are listed below.

A solar chimney, as a passive device, cannot generally respond to changes in the internal environment and thus it is unsuitable if control of the indoor environment is essential.

They may not sufficiently cover the cooling needs during the whole cooling period and thus alternative techniques and backup systems may be required.

Solar chimneys are more suited to open layouts or for individual rooms as the pressure loss associated with air flows between rooms will affect the total flow.

Research done on updraft towers points to an economy of scales based on the size of the collector and the height of the tower. To put it simply, the levelised energy cost (LEC) drops with larger collectors and higher towers. This is because the thermodynamic efficiency increases with higher towers as suction is increased and the air pulled into the tower moves faster and with a higher potential pressure difference for the turbine. The cost of electricity can be cut by a third based on a system that produces 200 megawatts as compared to a system that produces 5 megawatts. Thus, the initial investment for an economically viable solar updraft system is much greater because of the large scale necessary to lower the LEC.

However, there are several environmental problems associated with solar towers. The first is that they will be placed in the middle of the desert. The desert areas of the planet have a high albedo (i.e. reflective power) and currently reflect 35-45% of the sunlight they receive. Dark glass paneling, such as would compose the greenhouse of the solar tower, would reflect less of the sunlight and absorbing more heat. While the change in albedo is probably not large enough to significantly affect the albedo of the earth, it may have an effect on local climate.

A more local problem is that of ecosystem degradation. For example, the area around Buronga in New South Walesa, Australia, is mostly state land, pretty rural. Most solar towers would probably be placed in rural areas; and since they take up almost 32.5 KM squared, it will have a pretty significant impact on local ecosystems. Road building and turbine noise will also cause problems. Also, these towers, at 1 km high, will be able to be seen from very far away.

Geothermal Systems

Geothermal systems are also known in the art, and may include, e.g., either a geothermal heat pump, ground source heat pump (GSHP), or ground heat pump, which is a central heating and/or cooling system that pumps heat to or from the ground.

By way of example, one known geothermal system includes a single-well engineered geothermal system (also known hereinafter as "SWEGS") that is disclosed in U.S. patent application Ser. No. 12/456,434, which corresponds to U.S. Patent Publication no. US 2009/0320475, which is hereby incorporated by reference in its entirety. The SWEGS includes, or takes the form of, a closed-loop, solid-state system that may be configured to generate electricity from geothermal heat from a well by a flow of heat, without needing large quantities of water to conduct heat from the ground. The SWEGS includes a heat extraction system for generating geothermal heat from within a drilled well, having a heat conductive material injected into an area within a heat nest near the bottom of the drilled well between a heat exchanging element and rock (and any fluid around the rock) surrounding the heat nest to form a closed-loop solid state heat exchange to heat content (e.g., fluidic or gas content) of a piping system flowing into and out of the heat exchanging element at an equilibrium temperature at which the rock (and any fluid around the rock) surrounding the heat nest and generating the geothermal heat continually recoups the geothermal heat that the rock (and any fluid around the rock) is conducting to the heat conductive material and above which the geothermal heat generated by the rock (and any fluid around the rock) surrounding the heat nest dissipates as the heat conductive material conducts heat from the rock (and any fluid around the rock) surrounding the heat nest to the heat exchanging element. The heat nest is understood to be an area between a heat point and the bottom of the well that is constructed at a desired depth after a surface area of the surrounding rock (and any fluid around the rock) has been increased to ensure a maximum temperature and flow of geothermal generated by the rock (and any fluid around the rock), and the heat point is understood to be the lowest depth where an appropriate heat is encountered, consistent with that disclosed in the aforementioned U.S. Patent Publication no. US 2009/0320475, e.g., including paragraph [0032] through [0034] and FIG. 5 disclosed therein. The heat conductive material may be configured to solidify to substantially fill the area within the heat nest to transfer heat from the rock surrounding the heat nest and the heat exchanging element. The heat conductive material may include, or take the form of, any substance or material that conducts heat at the temperature required within the well, e.g., including substances or materials like grout, enhanced grout, plastic, ceramics, enhanced ceramics, molten metal such as for instance copper, or any combination of these substances or materials, consistent with that disclosed in paragraph [0049] of the aforementioned U.S. Patent Publication no. US 2009/0320475. The heat conductive material may stabilize pressure on the piping system and the heat exchanging element within the heat nest. The piping system may be configured to bring the content from a surface of the well into the heat nest and carry heated content to the surface of the well from the heat nest. The closed-loop solid state heat exchange may be configured to extract geothermal heat from the well without exposing the rock (and any fluid around the rock) surrounding the heat nest to a liquid flow, by receiving cold fluid and providing heated content or hot fluid to the piping system for further processing.

The SWEGS uses commercially-available components in an innovative process that is cost competitive with conventional fossil fuel-based power generation technologies. The heat nest harvests geothermal heat from a single well to inexpensively produce a cost competitive, consistent supply of reliable and totally green thermal energy. The SWEGS technology may be used to tap widely-available 'hot dry rock' to produce geothermal energy. It requires no fracturing of the earth, no injection of water, and does not create seismic or hydrologic disruption. In addition, it creates no water or air pollution, and produces renewable thermal energy with substantially no carbon footprint.

As a "base load" (24/7) source of energy, the SWEGS geothermal energy may be used to produce electricity at a greater capacity (90+%) than any other source of power. Nuclear power is second in power generation capacity efficiency, but is not distributable, takes a very long time to build, is very expensive to build and presents significant risks during plant operation and for hundreds of years later.

Different embodiments of the SWEGS may include one or more of the following: The equilibrium temperature may be increased by increasing the surface area of the rock (and any fluid around the rock) surrounding the heat nest, and may be in a range of temperatures determined at least in part by a surface area of the rock (and any fluid around the rock) within the heat nest. At least one additional bore hole may be drilled into the rock (and any fluid around the rock) to increase the surface area of the rock; at least one additional material may be injected into the heat nest, including at least one or more of the following: a ball bearing, a bead, a meshed metallic material, a rod, a heat pipe, a foam, a metal, a plastic, or any highly conductive material. The piping system may include a set of flexible downward-flowing pipes that carry the content of the piping system into the heat exchanging element, and a set of flexible upward-flowing pipes that carry the content of the heat exchanger out of the heat exchanging element. The downward-flowing pipes and upward-flowing pipes each may include a plurality of layers of wound corrosion resistant steel heat insulating material. The heat exchanging element may include a plurality of capillaries. The content of the downward-flowing pipes may be dispersed through the plurality of capillaries after entering the heat exchanging element. Each capillary in the plurality of capillaries has a diameter smaller than a diameter of the downward-flowing pipes, thereby allowing the content of the piping system to heat quickly as the content passes through the plurality of capillaries. The content of the piping system may be an environmentally inert, heat conductive fluid that does not boil when heated within the heat nest or water under pressure. By way of example, the content of the piping system may be water under pressure or a gas under pressure. The heat exchanging element may have a helix shape in which the piping system within the heat exchanging element comprises at least one twisted pipe to increase the distance content of the piping system flows within the heat exchanging element.

The overall SWEGS technology taps widely-available 'hot dry rock' to produce geothermal energy, where 'hot dry rock' is understood to be rock or rock that contains brine, water or fluid. (As a person skilled in the art would understand and appreciate, if rock having little or no fluid around the rock (e.g. solid dry rock) has a heat flow with a factor of X, then any fluid around the rock is likely to increase the heat flow by an order of magnitude at least 10×, e.g., in the case of permeable wet rock where convection is created, or by an order of magnitude at least 1000×, e.g. in the case of a brine flow of liquid like a river flow.) It requires no fracturing of the earth, no injection of water, and does not create seismic or hydrologic disruption. In addition, it creates no water or air pollution, and produces renewable power with a zero carbon footprint. Using SWEGS to produce steam in current steamflood (or steam drive) systems completely eliminates cost and contamination of burning fossil fuels.

Colder fluid is pumped down into the SWEGS for heating. Heated fluid is returned to the surface and passed into a heat exchanger (heat is above the boiling point of water). Heat is exchanged into the water creating steam.

Other SWEGS-Related Technology

Other SWEGS-related patent applications have also been filed, including U.S. patent application Ser. No. 12/462,657, which corresponds to Publication no. US 2010/0276115; U.S. patent application Ser. No. 12/462,661, which corresponds to Publication no. US 2010/0270002; U.S. patent application Ser. No. 12/462,658, which corresponds to Publication no. US 2010/0270001; and U.S. patent application Ser. No. 12/462,656, which corresponds to Publication no. US 2010/0269501, which are all incorporated hereby incorporated by reference in their entirety.

By way of example, U.S. patent application Ser. No. 12/462,657 discloses a system and method of maximizing heat transfer at the bottom of a well using heat conductive components and a predictive model to design and implement a closed-loop solid state heat extraction system.

U.S. patent application Ser. No. 12/462,661 discloses a heat exchanger that transfers heat from solid state heat conducting material to a fluid in a closed-loop system.

U.S. patent application Ser. No. 12/462,658 discloses a method of transferring heat using grout that has been optimized to protect the materials from the corrosive environment and to allow for heat transfer includes a heat conductive particulate mixed with the grout. For example, in cases where the corrosive environment is not severe or of concern, embodiments may be implemented without using the grout, such that fluid flows directly around the heat exchanger, which increases the throughput by as much as 10×, and possibly even higher in the case where there is convection flow.

U.S. patent application Ser. No. 12/462,656 discloses a control system manages and optimizes a geothermal electric generation system from one or more wells that individually produce heat.

All of the aforementioned patent applications are incorporated by reference in their entirety.

Other SWEGS-Related Applications

Additional patent applications have been filed relating to the design of the cooling component of the technology as well as other applications of the SWEGS technology such as water purification, or heat for the leaching process in mining, greenhouse, fish farming, cooling/heating, remediation, mining, pasteurization and brewing applications. For example, the overall SWEGS technology may be used to produce base load electricity, and also use it to power a desalination process, converting salt water to fresh water making it suitable to drink or use for irrigation. If the geological conditions do not support the generation of electricity, the SWEGS technology may be used as a "Green Boiler" to provide thermal energy for the desalination of salt water or purification of brackish water.

ColdNest Technology

For example, a companion application disclosing ColdNest technology, is identified as PCT patent application serial no PCT/US12/36498, which claims benefit to an earlier filed provisional patent application Ser. No. 61/482,332, filed 4 May 2011, which are both incorporated by reference in their entirety. This companion application sets forth still an alternative embodiment to the basic SWEGS technology by incorporating, e.g., a ColdNest and optional cooling tower, and disclosed in detail in this companion application. In effect, the ColdNest™ concept involves using the Earth for cooling and a process for using the SWEGS for direct heating and cooling. These inventions may be used to expand the overall SWEGS technology into areas such as: water purification, water desalination, HVAC, remediation, EOR, mining, etc.

SWEGS-Based Cooling/Heating, Remediation, Mining, Pasteurization and Brewing Applications Moreover, other SWEGS-related applications have also been filed, including PCT/US12/36521, filed 4 May 2012, which claims benefit to U.S. provisional patent application Nos. 61/576,719. This application sets forth further applications of the basic SWEGS technology in the areas of cooling/heating applications, remediation applications, mining applications, pasteurization applications and brewing applications. By way of example, the application discloses apparatus featuring a heat extraction system (i.e. the SWEGS) in combination with some further apparatus for implementing some further functionality, e.g., associated with the aforementioned cooling/heating, remediation, mining, pasteurization and brewing applications.

SWEGS Used in Conjunction with Enhanced Oil Recovery (EOR)

The basic SWEGS technology may also be used in conjunction with enhanced oil recovery, e.g., in the areas of highly viscous oil recovery. Using SWEGS generated geothermal heat instead of fossil fuel to create heat and using either steam or a reverse SWEGS to deliver heat into a heavy oil deposit will significantly improve the oil recovery by improving the oil viscosity, consistent with that disclosed in provisional patent application No. 61/576,719, filed 16 Dec. 2011, which corresponds to PCT application no. PCT/US2012/070115, filed 17 Dec. 2012, concurrently with the instant patent application, which are both hereby incorporated by reference in its entirety.

Advantages and Contributions of SWEGS

The SWEGS technology disclosed in all these patent applications provides an important contribution to the state of the art of geothermal energy, including in the area of generating electricity, and also including in the area of heat extraction from the earth, e.g., to generate electricity. The SWEGS technology also represents a renewable green heat generator technology.

BRIEF SUMMARY OF THE INVENTION

In summary, according to some embodiments of the present invention, one or more SWEGS, e.g., shown in FIG. 2, may be used to heat the air in a draft tower, e.g., shown in FIG. 1. In a closed loop, cold fluid can be pumped into a SWEGS and heated to a temperature range of between 100° C.-300° C. This heated fluid or content can then flow through a heating element (radiator or specially designed heat exchanger) that heats the air in the draft tower. The heating of the air creates an upward draft in the draft tower that causes air to be pulled through one or more air/wind turbines that cause electricity to be generated.

The draft tower can be constructed from reinforced high tensile concrete. The large-scale turbines can be designed and constructed from lightweight alloy materials like those used in aircraft manufacture.

By way of example, a proposed 200 MW solar plant may have the following characteristics:
- The air will heat from 35 degrees Celsius on the edges of the tower to around 70 degrees Celsius once it reaches the middle.
- The air it will move at about 35 mph up the tower, losing about 1 degree Celsius for every 100 meters it travels.
- The tower may have as many as 32 turbines in it.

The present invention eliminates the constraints imposed on typical Solar and other updraft towers by using a geothermal heat source, such as the SWEGS, to supply higher quality (higher temperature) heat to maximize the efficiency and output power for a given tower height.

Using geothermal heat instead of solar changes the entire structure and performance dynamics of a draft tower that can be used for the production of electric power or combined energy applications. In particular, by using a heat source that can produce heat in the temperature range of between a range of about 150°-300° C. on a 24 hours a day, every day, basis one dramatically increases the performance potential of the draft tower. The following efficiencies occur when steady state higher temperatures from a hot fluid flow are available:
1. The height of the tower can be significantly reduced for a given efficiency and output power.
2. The amount of electricity produced can be increased for a given tower.
3. The electricity produced is 24 hours and 7 days/week.
4. The cost of the system can be reduced.
5. The amount of land required for the system can be dramatically reduced.
6. The sites where geothermal towers can be built is not limited by solar potential or capacity.
7. The towers can be integrated into buildings to create the power needs of the building and the surrounding community (Green Buildings) and further decrease overall system cost.
8. The turbine design can be optimized for performance and cost by the flexibility of turbine placement.
9. An additional heat exchanger can be added to the top of the tower to recapture heat from the exiting air.

EXAMPLES OF EMBODIMENTS OF THE PRESENT INVENTION

In its broadest sense, and according to some embodiments, the present invention may take the form of apparatus that includes a geothermal heat extraction system for generating geothermal heat from within a drilled well in combination with a new and unique draft power tower arrangement. The geothermal heat extraction system, e.g., the SWEGS, may be configured to provide content (e.g., gas or fluidic content) into a geothermal well, and receive heated content back from the geothermal well. The draft power tower arrangement may be configured to receive the heated content, and provide electrical power, based at least partly on the heated content received.

According to some embodiments of the present invention, the apparatus may also include one or more of the following features:

The draft power tower arrangement may include a tower having a top portion and a bottom portion; and a heat exchanger or radiator configured in the bottom portion.

The heat exchanger or radiator may be configured to receive the heated content and heat surrounding air, so as to cause heated surrounding air to rise up the tower, pass out the top portion, e.g., via a heated air outlet, and create a draft of upwardly moving heated air through and out the tower.

The bottom portion may be configured to an air inlet having at least one air turbine arranged therein configured to respond to the heated surrounding air, and provide the electrical power. Embodiments are also envisioned, and may typically include, a multiplicity of air inlet and a corresponding multiplicity of air turbines.

The heat exchanger or radiator may also be configured to provide colder content, based at least partly the heated content losing heat when the heat exchanger or radiator heats the surrounding air, and recirculate the same back to the SWEGS.

The draft power tower arrangement may be configured so that the bottom portion is configured underground, including where the heat exchanger or radiator is arranged underground.

The air inlet portion may be configured to receive outside surrounding air and pass the outside surrounding air to the air turbine.

The draft power tower arrangement may be configured as part of a building, including where the power tower arrangement is tied directly to, and supported by, the building. For example, the draft power tower arrangement may be configured inside or outside the building.

The draft power tower arrangement may be configured to provide electricity to the building, to provide heat to the building, and/or to provide ventilation for the building.

The draft power tower arrangement may include another heat exchanger configured on the top portion of the tower to recapture some heat from the heated surrounding air exiting the tower.

The other heat exchanger may be configured to receive the heated surrounding air and colder content provided from the radiator based at least partly the heated content losing heat when heating the surrounding air; heat the colder content so as form heat exchanger content that is hotter than the colder content; and provide the heat exchanger content back. The heat exchanger content may also be recirculate directly back to the heat exchanger or radiator.

The heat exchanger or radiator may include, or take the form of, a heat pipe heat exchanger.

The draft power tower may include a low temperature heat transfer zone having a low temperature heat exchanger or radiator and also includes a high temperature heat transfer zone having a high temperature heat exchanger or radiator, as well as a medium temperature heat exchanger or radiator.

In particular, and by way of example, the geothermal heat extraction system may include, or take the form of, a SWEGS configured for generating geothermal heat from within a well. The heat extraction system may include a heat conductive material injected into an area within a heat nest near a bottom of the drilled well between a heat exchanging element and rock, and any fluid around the rock, surrounding the heat nest to form a closed-loop solid state heat exchange to heat content of a piping system flowing into and out of the heat exchanging element at an equilibrium temperature at which the rock, and any fluid around the rock, surrounding the heat nest and generating the geothermal heat continually recoups the geothermal heat that the rock, and any fluid around the rock, is conducting to the heat conductive material and above which the geothermal heat generated by the rock, and any fluid around the rock, surrounding the heat nest dissipates as the heat conductive material conducts heat from the rock, and any fluid around the rock, surrounding the heat nest to the heat exchanging element. The heat conductive material may be configured to solidify to substantially fill the area within the heat nest to transfer heat from the rock, and any fluid around the rock, surrounding the heat nest and the heat exchanging element. The piping system may be configured to bring the content from a surface of the well into the heat nest and carry heated content to the surface of the well from the heat nest. The closed-loop solid state heat exchange may be configured to extract geothermal heat from the well without exposing the rock, and any fluid around the rock, surrounding the heat nest to a liquid flow, and provide heated content to the piping system for further processing.

The Method

According to some embodiments, the present invention may take the form of a method featuring generating with the SWEGS geothermal heat from within a drilled well, as described above, in combination with receiving with the draft power tower arrangement the heated content, and providing electrical power, based at least partly on the heated content received. The method may also include one or more of the other features, consistent with that set forth herein.

Means-Plus-Function Recitation of Present Invention

According to some embodiments of the present invention, the present invention may take the form of apparatus comprising: means for generating, e.g., with the SWEGS, geothermal heat from within a drilled well, as described above, in combination with means for receiving, e.g., with the draft power tower arrangement, the heated content, and providing electrical power, based at least partly on the heated content received.

BRIEF DESCRIPTION OF THE DRAWING

FIG. 5 includes illustrations of a power tower arrangement as part of a building, including FIG. 5a showing the power tower arrangement inside the building, and including FIG. 5b showing the power tower arrangement outside the building, according to some embodiments of the present invention.

FIG. 6 is an illustration of apparatus including part of a SWEGS in combination with a power tower arrangement, where a heat exchange is configured in a top portion of the power tower arrangement, according to some embodiments of the present invention.

FIG. 7a includes illustrations of a power tower arrangement, including FIG. 7a(1) showing an illustration of a tower and vertical air/wind turbines that form part of the power tower arrangement, and FIG. 7a(2) that is a cross section of the power tower arrangement shown in FIG. 7a(1) showing an illustration of the tower, the vertical air/wind turbines and heat pipe heat exchangers, according to some embodiments of the present invention.

DETAILED DESCRIPTION OF THE INVENTION

Figure 2:
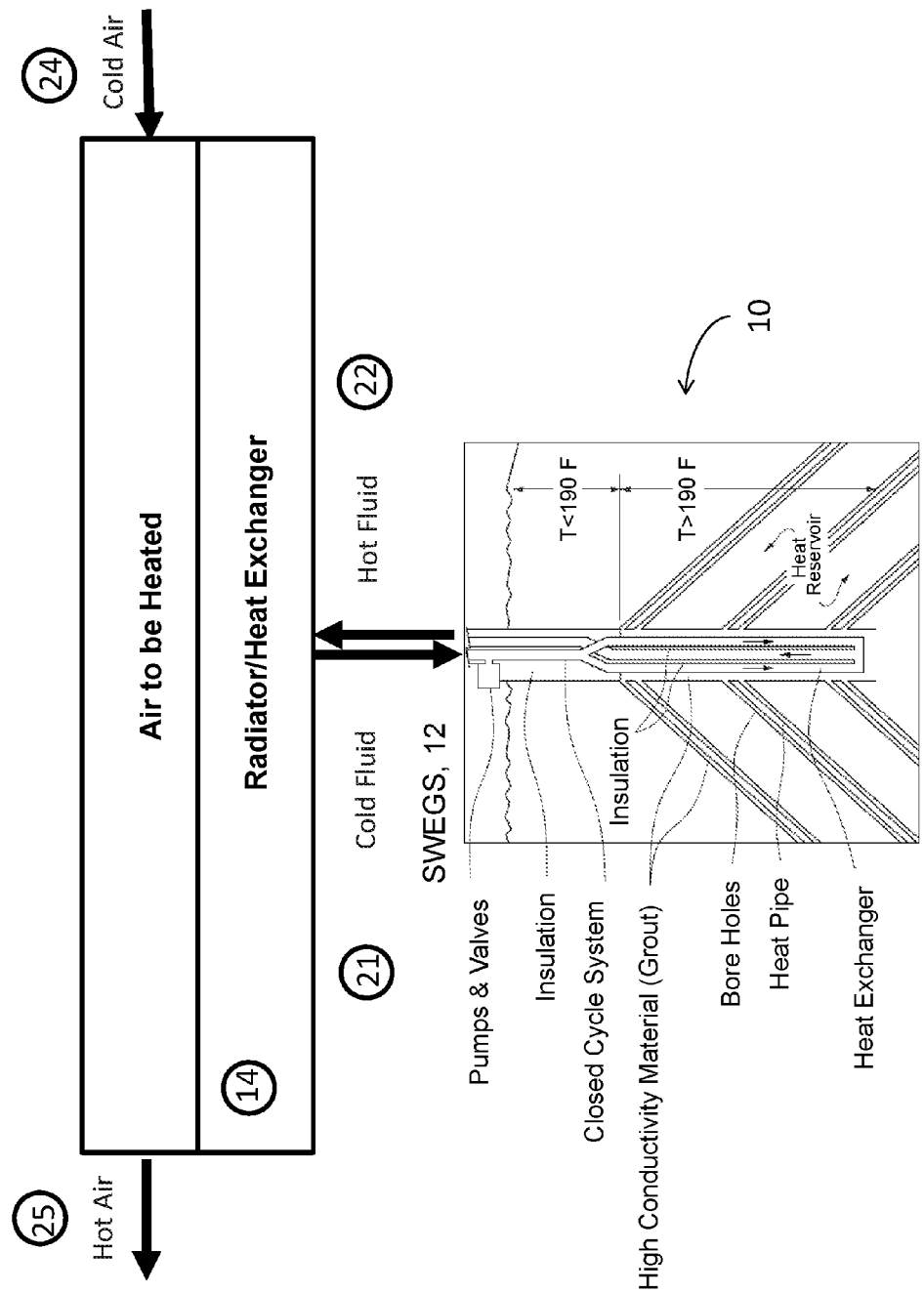
FIG. 2 is an illustration of apparatus including a heat extraction system (also known the SWEGS) in combination with a radiator/heat exchange for configuring in relation to part of a power tower arrangement, according to some embodiments of the present invention.

FIG. 2 is a block view of apparatus generally indicated as 10 having one or more SWEGS 12 that may be configured to heat air in a draft power tower arrangement, according to some embodiments of the present invention. In a closed loop, cold fluid 21 may be pumped into the SWEGS 12 and heated to a temperature in a range of, e.g., 100° C.-300° C., and hot fluid 22 pumped out of the SWEGS 12. This fluid flows through a heating element (e.g., a radiator or specially designed heat exchanger 14) that heats the air in the draft power tower arrangement, consistent with that shown in FIGS. 3-4 and 6-7a and 7b.

According to some embodiments, the present invention may take the form of the apparatus 10 that includes a geothermal heat extraction system, such as the SWEGS 12, for generating geothermal heat from within a drilled well in combination with a new and unique draft power tower arrangement generally indicated as 15 (FIGS. 3-4 and 6-7b below) that includes the radiator or specially designed heat exchanger 14 configured or arranged therein. The geothermal heat extraction system may be configured to provide content in the form of some fluid into a geothermal well, and receive heated content back from the geothermal well. The draft power tower arrangement 15 may be configured to receive the heated content 21, and provide electrical power, based at least partly on the heated content 21 received.

In FIG. 2, the SWEGS 12 is shown as a closed cycle system that may include a combination of the following elements: a heat exchanger, one or more heat pipes, bore holes, high conductivity grout, insulation in relation to the piping in the heat exchanger and insulation at the top. The SWEGS 12 also includes pumps and valves for pumping the fluid into and out of the closed loop system. By way of example, the SWEGS is shown with its lower portion that includes the heat exchanger configured in earth having a temperature >190° F., and with its upper portion in earth having a temperature <190° F. The earth having a temperature >190° F. forms a so-called heat reservoir around the heat exchanger.

Consistent with that shown in FIGS. 3-4 and 6-7b, the heat exchanger or radiator 14 may be configured to receive the heated content 21 and heat surrounding cooler air, so as to cause heated surrounding air generally indicated by arrows 24 to rise up a tower 15a, pass out a top portion 15b via a heated air outlet 25, and create a draft of upwardly moving heated air 24 through and out the tower 15a. Consistent with that described in further detail below, the draft of upwardly moving heated air causes air generally indicated by arrows 26 to move through one or more air/wind turbines 40, causing the electricity to be generated.

Figure 1:
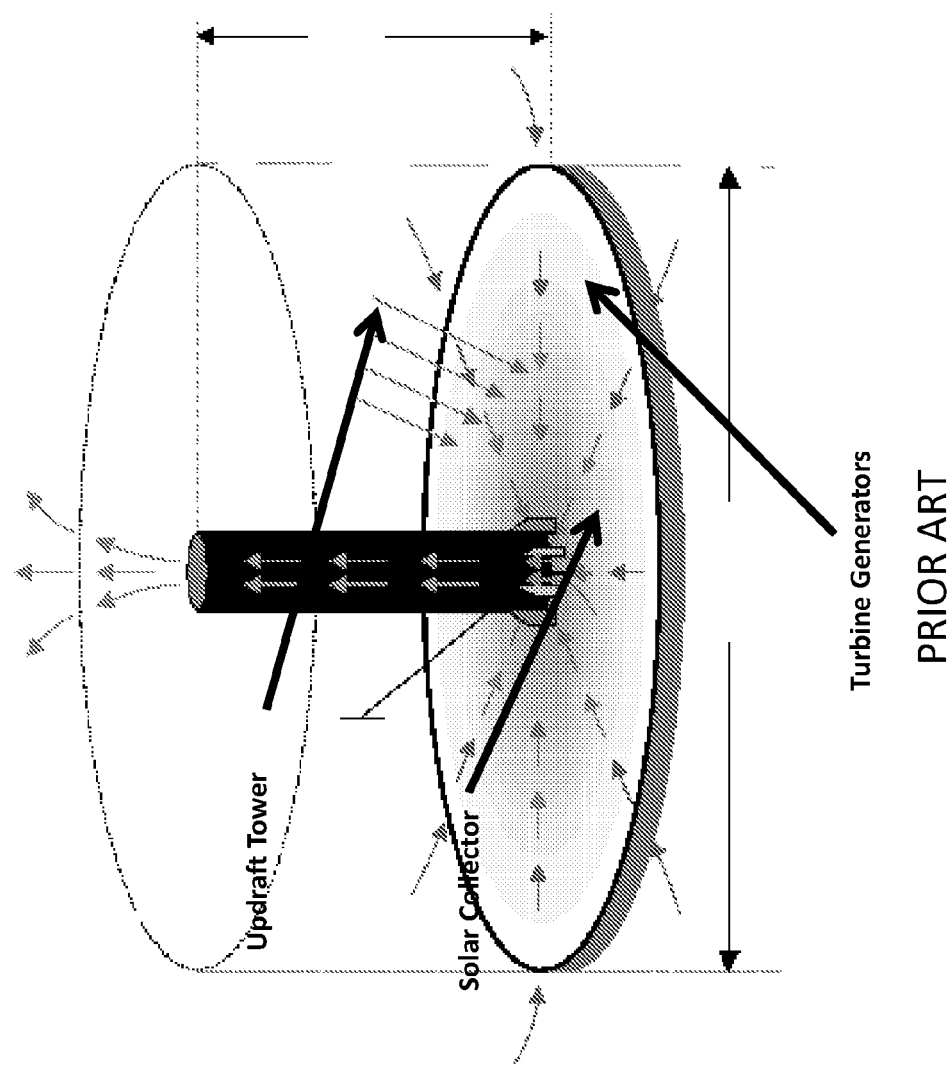
FIG. 1 is a diagram of a solar draft tower that is known in the art.
Figure 3:
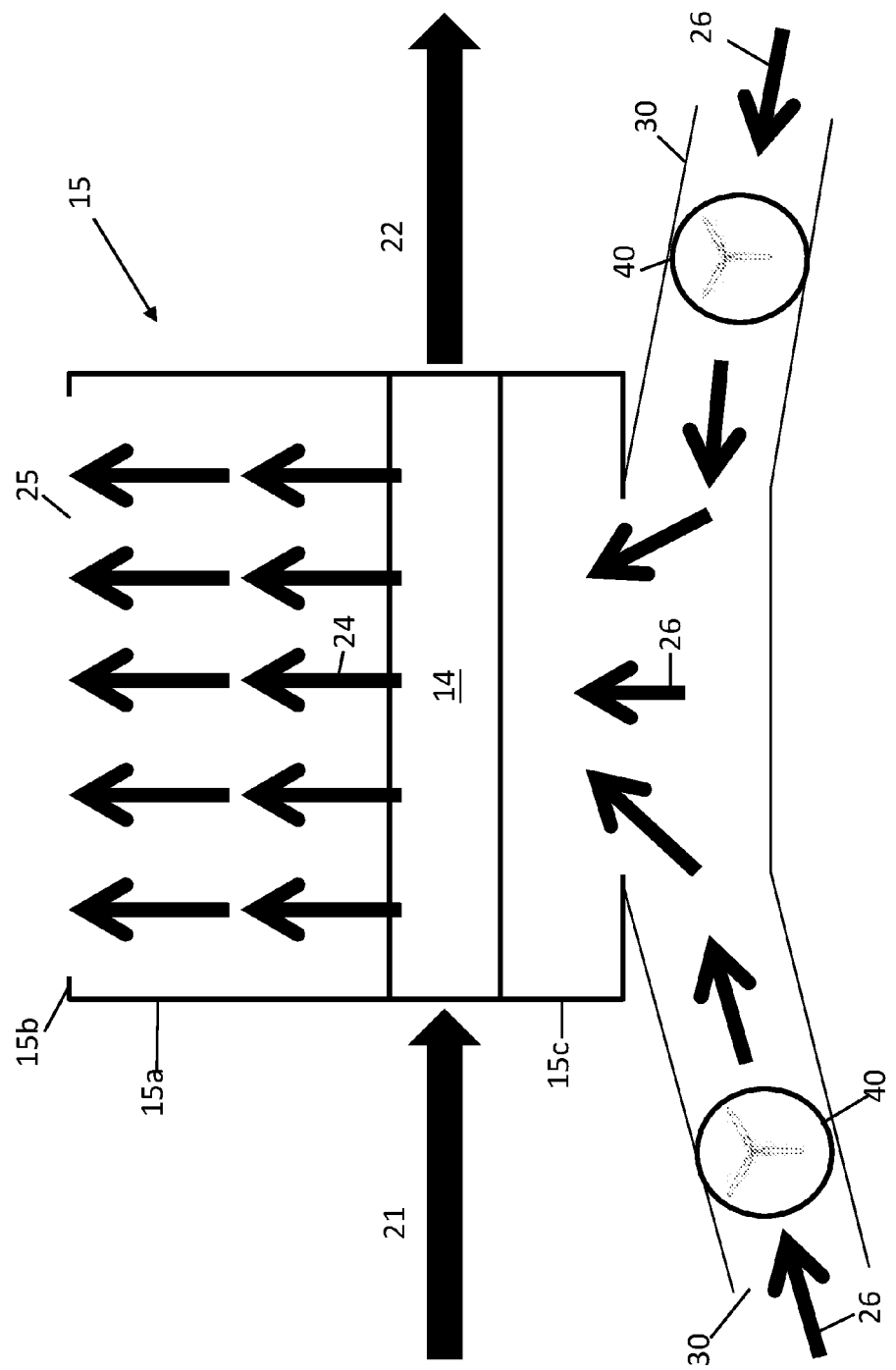
FIG. 3 is an illustration of apparatus including part of a SWEGS in combination with a power tower arrangement, according to some embodiments of the present invention.

FIG. 3 is a diagram of the draft power tower arrangement 15 powered by the heat supplied by the one or more SWEGS 12, e.g., shown in FIG. 2. In summary, the principal of the draft tower 15*a* is similar to that shown in FIG. 1, except the amount of heat delivered to create the upward flow of air is substantially dramatically enhanced according to the present invention. This enhanced heat allows a given tower 15 to deliver more power. A shorter tower may therefore yield the same conversion efficiency as a taller lower temperature tower found in the solar embodiment shown in relation to FIG. 1. Another key advantage to embodiments according to the present invention is enabling the air turbines 40 to be placed at the coldest air flow location—in air inlets 30 to the main heat exchanger or radiator 14. The high gas density and lower temperature may be a key design advantage in maximizing efficiency and minimizing cost of the wind turbine 40. This is only possible because of the small size of this heat exchanger 30 relative to the diffuse nature of the solar collector in the solar tower approach shown in FIG. 1.

The draft power tower arrangement 15 include the tower 15*a* having the top portion 15*b* and a bottom portion 15*c*; and the heat exchanger or radiator 14 configured in the bottom portion 15*c*. A person skilled in the art would appreciate and understand how to configure or arrange the heat exchanger or radiator 14 in the bottom portion 15*c* in order to implement the present invention without undue experimentation, consistent with that disclosed herein. Moreover, the scope of the invention is not intended to be limited to using any particular configuration or arrangement either now known or later developed in the future with the spirit of the present invention.

The heat exchanger or radiator 14 may be configured to receive the heated content and heat surrounding air, so as to cause heated surrounding air to rise up the tower 15*a*, pass out the top portion 15*b* via a heated air outlet, and create a draft of upwardly moving heated air through and out the tower 15*a*. Heat exchangers or radiators like element 14 are known in the art, and the scope of the invention is not intended to be limited to any particular type or kind thereof either now known or later developed in the future.

Figure 4:
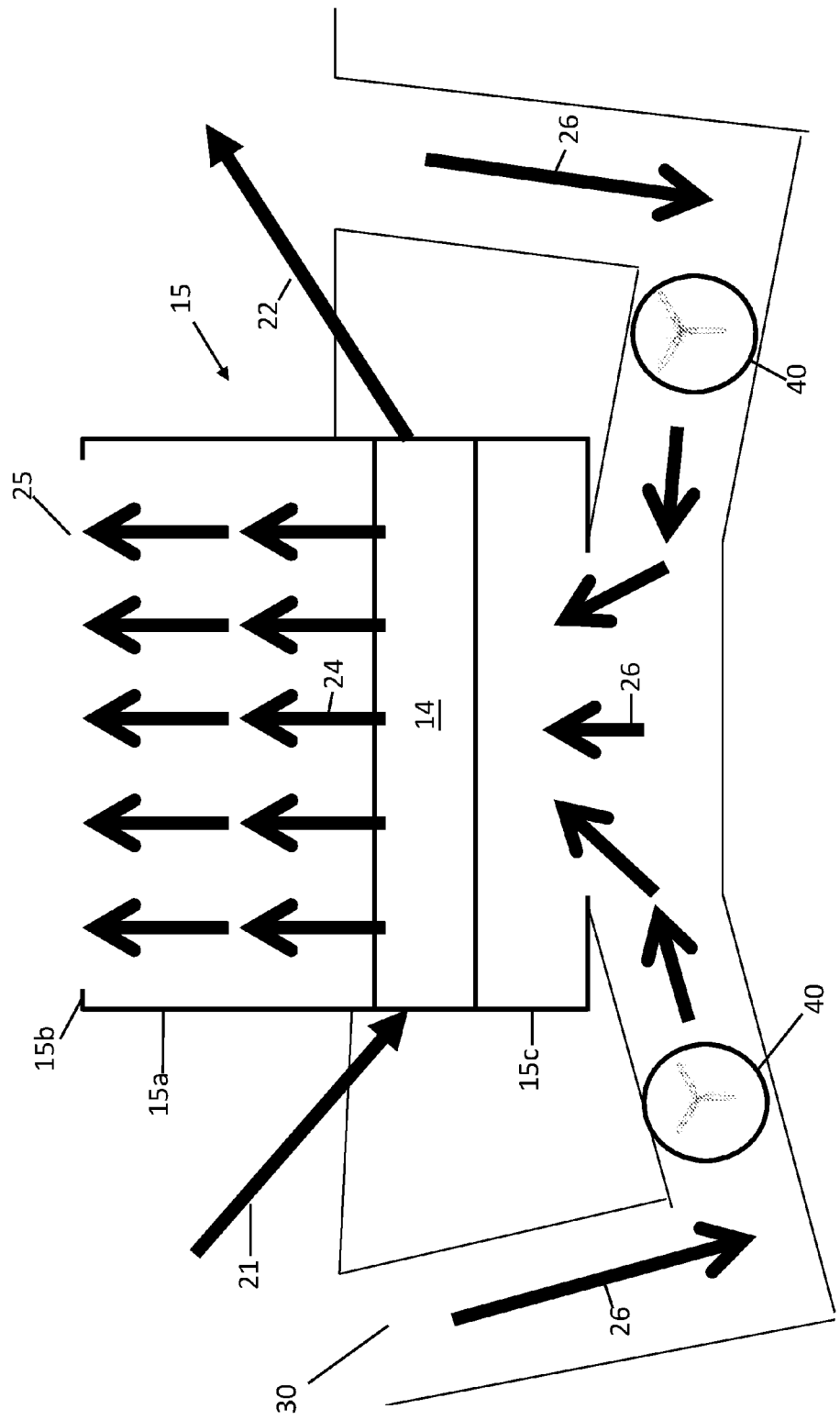
FIG. 4 is an illustration of apparatus including part of a SWEGS in combination with a power tower arrangement, where a portion of the power tower arrangement is constructed below ground, according to some embodiments of the present invention.

FIG. 4 shows the power tower arrangement 15 having the bottom portion of the tower 15*a* constructed or configured below ground. Key considerations will include or be the optimized cost of "chimney" construction (especially for very high towers) and environmental, visual, and aesthetic considerations that may enable projects that could not otherwise be permitted.

As shown in FIGS. 3-4 and 6, the power tower arrangement 15 also includes one or more air inlets 30 and one or more corresponding air turbines 40. As shown, the bottom portion 15*c* may be configured with the one or more air inlets 30 having the one or more air turbines 40 arranged therein configured to respond to the heated surrounding air, and provide the electrical power. Embodiments are also envisioned, and may typically include, a multiplicity of air inlets like element 30 and a corresponding multiplicity of air turbines like element 40. Air turbines like element 40, and the generation of electricity using such air turbines like element 40, are both known in the art, and the scope of the invention is not intended to be limited to any particular type or kind of air turbine, or any particular type or kind of implementation or technique for the generation of electricity using such air turbines like element 40, either now known or later developed in the future. The scope of the invention is also not intended to be limited to any particular number of air inlets or corresponding air/wind turbines, the number of which will depend on the particular application.

As shown in FIGS. 3 and 6, the heat exchanger or radiator 14 may also be configured to provide colder content 22, based at least partly the heated content losing heat when the heat exchanger or radiator heats the surrounding air, that is recirculated back to the SWEGS 12 (FIG. 2).

As shown in FIG. 5, the draft power tower arrangement 15 may be formed or built as part of a building. This is a key feature in that the cost of the tower 15*a* can be greatly reduced when tied to an existing structure or integrated into a new building. The close proximity to an electric and heating load as well as the potential additional application of building ventilation are both important characteristics of this overall concept.

As shown in FIG. 6, the draft power tower arrangement 15 may be configured with another heat exchanger 17 arranged at the top portion 15*b* of the tower 15*a* to recapture some of the heat from the air exiting the tower 15*a*. As shown, the heat exchanger 17 may be configured to receive colder fluid being provided from the radiator 14 and recirculated back to the SWEGS 12, heat the same, and recirculate heated content back to the heated content being provided to the radiator 14.

FIG. 7*a* shows a combination of the tower 15*a* and the vertical air/wind turbines 40 that form part of the power tower arrangement 15, according to some embodiments of the present invention. In FIG. 7*a*(2), the tower 15*a* and the vertical air/wind turbines 40 are shown in relation to three heat pipe heat exchangers 14*a*, 14*b*, 14*c*, each forming part of a respective high temperature heat transfer zone 14*a*', a medium temperature heat transfer zone 14*b*', and a low temperature heat transfer zone 14*c*', according to some embodiments of the present invention. By way of example, the bottom of the tower 15*a* is shown having a horizontal dimension of about 200', the air/wind turbines 40 are shown having a vertical dimension of about 30', and the combined height of the tower 15*a* and the air/wind turbines 40 is shown having a vertical dimension of about 700'. The scope of the invention is not intended to using any particular dimensions for the base of tower 15*a*, the air/wind turbines or the combined height thereof.

Figure 7B:
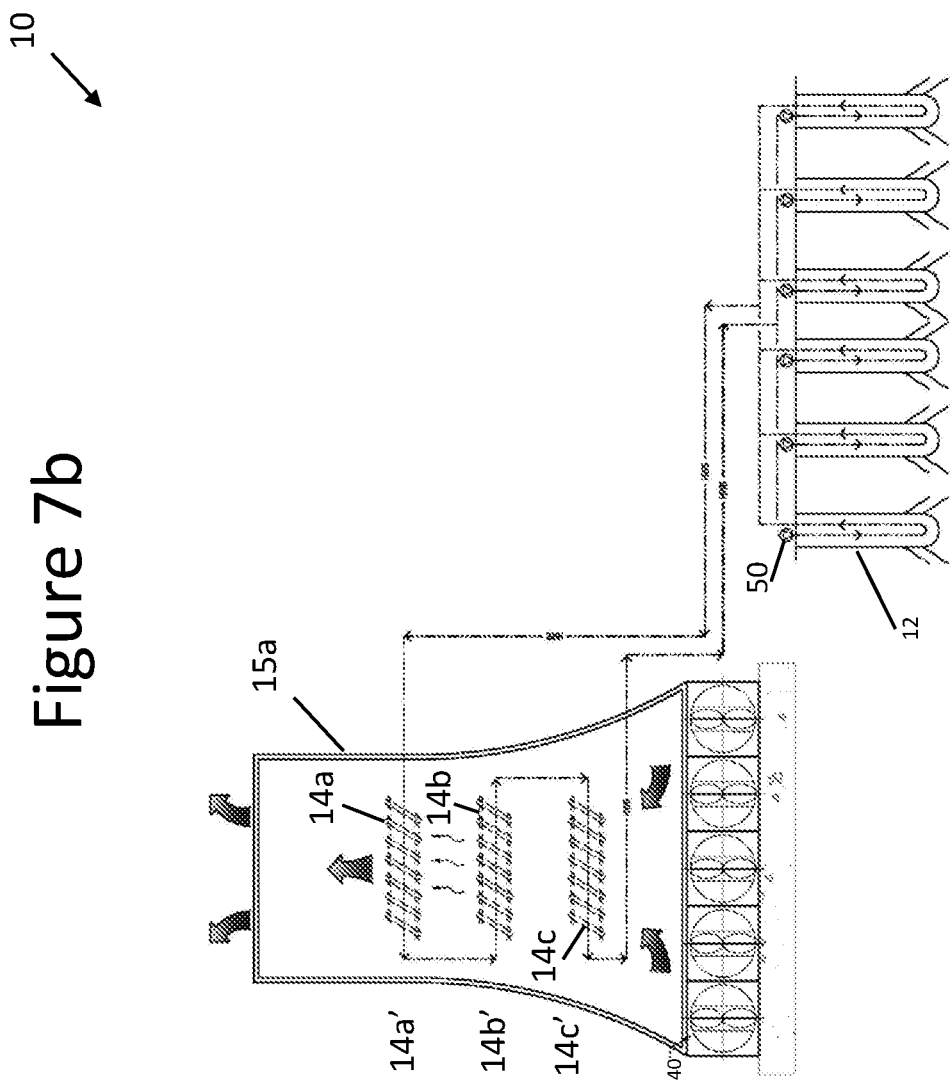
FIG. 7b includes an illustration of apparatus including six (6) SWEGS in combination with the tower arrangement shown in FIG. 7a(2), according to some embodiments of the present invention.

FIG. 7*b* shows the apparatus 10 including six (6) SWEGS in combination with the power tower arrangement 15 shown in FIG. 7*a*(2), according to some embodiments of the present invention. The scope of the invention is not intended to be limited to any particular number of air/wind turbines, or any particular number of SWEGS 12.

Heat Conductivity Material

The highly conductive material carries the heat form the heat exchanger into the rock containing the oil, providing continuous heat allows the rock (and any fluid around the rock) surrounding the horizontal bore holes to conduct the heat to rock (and any fluid around the rock) that is further away from the horizontal bore holes extending the reach of the system. By way of example, the conductive material can be any of the following forms of heat conductive material and configurations: rods, heat pipes, wire mesh, beads/spheres, foam, plastics, ceramics, crystals, closed loops, metals, carbons, powders and/or polymers. The scope of the invention is also intended to include other types or kinds of heat conductive material either now known or later developed in the future.

Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not necessarily drawn to scale.

Although the invention has been described and illustrated with respect to exemplary embodiments thereof, the foregoing and various other additions and omissions may be made therein and thereto without departing from the spirit and scope of the present invention.

We claim:

1. Apparatus comprising:
    a geothermal heat extraction system for generating geothermal heat from within a well configured to provide content into the well to be heated, and receive heated content back from the well; and
    a draft power tower arrangement, configured to receive the heated content from the geothermal heat extraction system, and provide electrical power, based at least partly on the heated content received, wherein the draft power tower arrangement comprises:
        a tower having a top portion and a bottom portion;
        a first heating element configured in the bottom portion, the first heating element configured to receive the heated content and heat surrounding air so as to cause heated surrounding air to rise up the tower toward a heated air outlet in the top portion and create a draft of upwardly moving heated air through and out the tower, and configured to provide colder content based at least partly on the heated content losing heat to heat the surrounding air; and
        a second heating element configured in the top portion, the second heating element configured to receive at least a portion of the colder content provided by the first heating element, receive at least a portion of the heated surrounding air, heat the colder content so as to create further heated content, and provide the further heated content to the first heating element.

2. Apparatus according to claim 1, wherein the second heating element is a heat exchanger or a radiator.

3. Apparatus according to claim 1, wherein at least a further portion of the colder content is provided to the geothermal heat extraction system.

4. Apparatus according to claim 1, wherein the draft power tower arrangement is configured so that the bottom portion is configured underground, including the first heating element.

5. Apparatus according to claim 1, wherein the first heating element is a heat exchanger or a radiator.

6. Apparatus according to claim 5, wherein one or more of the first heating element and the second element includes a heat pipe heat exchanger.

7. Apparatus according to claim 1, wherein the bottom portion is configured to include an air inlet having at least one air turbine arranged therein configured to respond to the heated surrounding air, and provide the electrical power.

8. Apparatus according to claim 7, wherein the air inlet is configured to receive outside surrounding air and pass the outside surrounding air to the air turbine.

9. Apparatus according to claim 1, wherein the geothermal heat extraction system comprises:
    a heat conductive material injected into an area within a heat nest near a bottom of the well between a heat exchanging element and rock, and any fluid around the rock, surrounding the heat nest to form a closed-loop solid state heat exchange to heat content of a piping system flowing into and out of the heat exchanging element at an equilibrium temperature at which the rock, and any fluid around the rock, surrounding the heat nest and generating the geothermal heat continually recoups the geothermal heat that the rock, and any fluid around the rock, is conducting to the heat conductive material and above which the geothermal heat generated by the rock, and any fluid around the rock, surrounding the heat nest dissipates as the heat conductive material conducts heat from the rock, and any fluid around the rock, surrounding the heat nest to the heat exchanging element,
    the heat conductive material configured to solidify to substantially fill the area within the heat nest to transfer heat from the rock, and any fluid around the rock, surrounding the heat nest and the heat exchanging element,
    the piping system configured to bring the content from a surface of the well into the heat nest and carry heated content to the surface of the well from the heat nest, and
    the closed-loop solid state heat exchange configured to extract geothermal heat from the well without exposing the rock, and any fluid around the rock, surrounding the heat nest to a liquid flow, and provide heated content to the piping system for further processing.

10. Apparatus according to claim 9, wherein the heat conductive material is selected from a group comprised of:
    rods, heat pipes, wire mesh, beads/spheres, foam, plastics, ceramics, crystals, closed loops, metals, carbons, powders, and/or fluids.

11. Apparatus according to claim 1, wherein the draft power tower arrangement is configured as part of a building, including where the power tower arrangement is tied to the building.

12. Apparatus according to claim 11, wherein the draft power tower arrangement is configured inside the building.

13. Apparatus according to claim 11, wherein the draft power tower arrangement is configured outside the building.

14. Apparatus according to claim 11, wherein the draft power tower arrangement is configured to provide electricity to the building.

15. Apparatus according to claim 11, wherein the draft power tower arrangement is configured to provide heat to the building.

16. Apparatus according to claim 11, wherein the draft power tower arrangement is configured to provide ventilation for the building.

* * * * *